(12) United States Patent
Pattee

(10) Patent No.: US 7,421,798 B2
(45) Date of Patent: Sep. 9, 2008

(54) PRECISION MITER GAUGE SETTING FIXTURE

(76) Inventor: Richard Pattee, 1205 Wall St., Tracy, CA (US) 95376

( * ) Notice: Subject to any disclaimer, the term of this patent is extended or adjusted under 35 U.S.C. 154(b) by 0 days.

(21) Appl. No.: 12/019,340

(22) Filed: Jan. 24, 2008

(65) Prior Publication Data

US 2008/0178486 A1 Jul. 31, 2008

Related U.S. Application Data

(60) Provisional application No. 60/887,327, filed on Jan. 30, 2007.

(51) Int. Cl.
*B23Q 17/22* (2006.01)
*B43L 7/12* (2006.01)
(52) U.S. Cl. ............................. 33/640; 33/626; 33/534
(58) Field of Classification Search ........... 33/640–642, 33/533–534, 633, 636, 626, 628, 630, 471; 83/437.2
See application file for complete search history.

(56) References Cited

U.S. PATENT DOCUMENTS

| 5,845,410 | A * | 12/1998 | Boker | 33/536 |
| 6,672,190 | B2 * | 1/2004 | Taylor | 83/437.2 |
| 2003/0015078 | A1 * | 1/2003 | Taylor | 83/437.2 |
| 2005/0279200 | A1 * | 12/2005 | Duginske | 83/471.3 |

* cited by examiner

*Primary Examiner*—Yaritza Guadalupe-McCall
(74) *Attorney, Agent, or Firm*—David E. Newhouse, Esq.

(57) ABSTRACT

A precision miter gauge setting fixture system is described that includes a horizontal surface with a miter bar channel that bisects at least one pair of symmetrical arcs of angularly spaced, position receptacles drilled into the surface, where each angular position receptacle of a paired set of arcs, radially centers on a base position receptacle of the other symmetrically paired arc of angularly space, position receptacles. A pair of position posts, one snugly seated in the base position receptacle of one of the paired symmetrical arcs of angularly spaced, position receptacles, the other snugly seated in one of the angularly spaced, position receptacles of the other symmetrically paired arc define the desired angle for setting the angle of a miter fence head relative to the miter bar of a miter gauge received and sliding in the miter bar channel.

The described precision miter gauge setting fixture system further includes one or more straight edged, accessory, detent step bars each having a length sufficient to span the radial distance between a base position receptacle of one of a pair of symmetrical arcs of angularly spaced, position receptacles and each of the angularly spaced, position receptacles of the other arc of the pair. Each straight edged, accessory, detent step bar also has one or more step detents, each detent incrementally increasing in depth, cut into one or both of its opposite longitudinal straight side edges proximate one or both of its ends for incrementally adding to and subtracting from the angle defined by the respectively seated, position posts, where the angle of the miter fence head of the miter gauge is determined by the angle of the longitudinal straight edge of the step dent bar opposite a particular step detent abutting against one or the other of the respectively seated position posts.

10 Claims, 2 Drawing Sheets

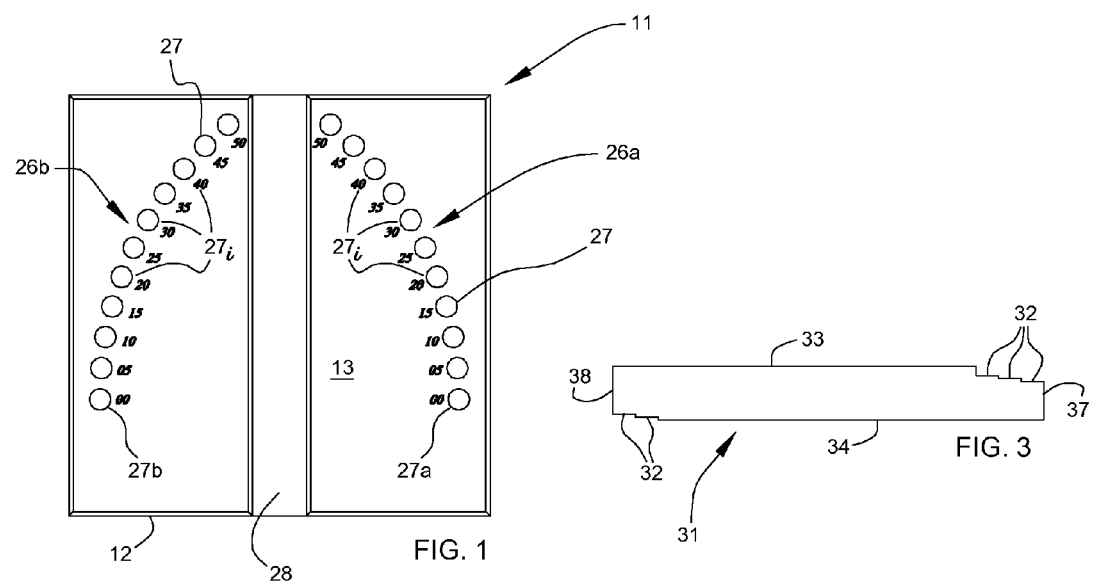
FIG. 1
FIG. 3
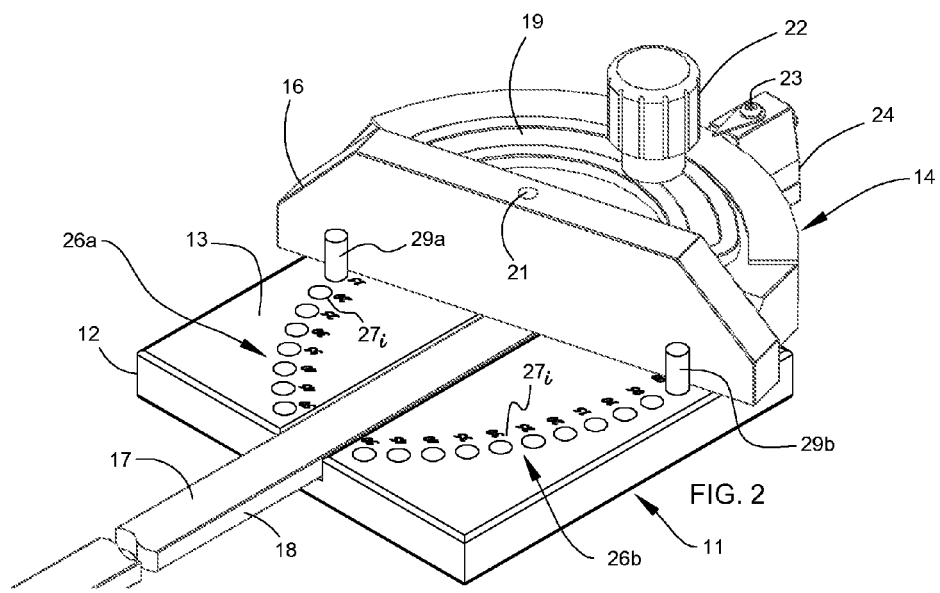
FIG. 2

PRECISION MITER GAUGE SETTING FIXTURE

RELATED APPLICATIONS

This application relates to U.S. Provisional Patent Application Ser. Nos. 60/887,327 filed Jan. 30, 2007, and is incorporated herein by reference. Any all benefits accruing by reason of U.S. Provisional Patent Application Ser. Nos. 60/887,327 are claimed.

BACKGROUND OF THE INVENTION

1. Field of the Invention

The invention relates to calibration tools and fixtures for precisely setting the angle of miter gauges for table saws, band saws, sanding machines, grinders, shapers, and other primary machines used to shape wood, metal, plastic, fiber and other common stock materials for cutting/forming precise angular edges/surfaces on stock materials, e.g., a picture frame.

2. Description of the Prior Art

Miter gauges for table saws, band saws, sanding machines, grinders, shapers, routers and the like present a vertical fence or miter fence head pivotally secured at the end of a base rail or miter bar that slides within worktable channels cut into a horizontal work table surface on either side of, and parallel to the cutting/working element of a particular machine. The miter fence head of the miter gauge sliding within one of the worktable channels contacts, orients and supports work pieces or stock on the work table relative to the cutting/working element of a machine cutting/shaping the stock.

Most miter fence heads include a circular slot concentric with the pivot coupling the head to the miter bar, a compass scale indexing the circular slot and a thumbscrew or other position locking mechanism for securing or setting the miter fence head at a particular angle indicated by the compass scale relative to the miter bar. However, the accuracy of an angular position achievable with such included compass scale, miter angle setting mechanisms is questionable.

Historically many different mechanisms are known, and have been described and developed for precisely orienting contact surfaces that position work stock for cutting/shaping by machines. In fact, the U.S. Manual of Patent Classification has several subject matter classes and subclasses dedicated to such mechanisms. [See Class 33 subclass 534, 567, & 568; and Class 83 subclasses 276, 409, 437.1, 452.11, 435.12, & 730]

SUMMARY OF THE INVENTION

The invented precision miter gauge setting fixture includes a horizontal surface with a miter bar channel that bisects at least one pair of symmetrical arcs of angularly spaced, position receptacles drilled into the surface, where each angular position receptacle of a paired set of arcs, radially centers on a base position receptacle of the other symmetrically paired arc of angular position receptacles. A pair of position posts, one snugly seated in the base position receptacle of one of the paired symmetrical arcs of angular position receptacles, the other snugly seated in one of the angular position receptacles of the other arc of the pair, define the desired angle for setting the angle of a miter gauge fence head relative to the miter bar of a gauge received and sliding in the miter bar channel of the fixture.

The invented precision miter gauge setting fixture further includes, as an accessory, one or more straight edged, step bars each having a length sufficient to span the radial distance between a base position receptacle of one of a pair of symmetrical arcs of angular position receptacles and each of the angular position receptacles of the other arc of the pair. Each straight edged, accessory, step bar has one or more step detents, each detent incrementally increasing in depth, cut into one or both of its opposite, longitudinal straight edges proximate one or both of its ends for incrementally adding to or subtracting from the angle defined by the respectively seated, position posts, where the angle of the miter fence head of the miter gauge is determined by the angle the free or open longitudinal straight edge of the step dent bar opposite a particular step detent abutting against one or the other of the respectively seated position posts.

One of the novel aspects of the invented precision, miter gauge setting fixture relates to configuring each pair of symmetrical arcs of angular position receptacles as converging circular arcs such that each angular position receptacle of the respective paired arcs is at the same radial distance from each respective base position receptacle of the other arc.

Using the invented miter gauge setting fixture, the angle of a miter gauge a fence head is set by placing the miter gauge on the fixture with the miter bar received in the miter bar channel of the fixture, and sliding the miter bar in the channel, allowing the fence head to pivot either into contact with the pair of position posts, respectively seated in a base position receptacle and an angular position receptacle of the symmetrically paired arcs of angular position receptacles, or into contact with the free or open, longitudinal straight edge of the detent step bar, not abutting against the so seated position posts, and then setting and securing the fence head at the particular angle (relative to the miter bar channel of the fixture and received miter bar) determined by the seated pair of position posts, or that particular angle, plus or minus an increment, determined by the depth of the detent of the step detent bar abutting against one or the other of the position posts.

Still other aspects and advantages of the invented precision, miter gauge setting fixture relate to angularly spacing the position receptacles in the respective converging arcs in equal angular intervals.

DESCRIPTION OF THE DRAWINGS

FIG. 1 is a top plane view of the precision, miter gauge setting fixture showing a miter bar channel cut into the horizontal surface of the fixture bisecting a pair of symmetrically converging, circular arcs of position receptacles drilled perpendicularly into the horizontal surface of the fixture.

FIG. 2 is a perspective rendering of a typical miter gauge received in the precision setting fixture with the gauge miter bar received and sliding in the miter bar channel and the miter fence head abutting against a pair of position posts, respectively seated in a base position receptacle and an angular position receptacle of the symmetrically paired arc of position receptacles.

FIG. 3 is a top plane view of an accessory, straight edged, detent step bar showing five incremental step detents cut into opposite, parallel straight edges of, and at opposite ends of the step bar.

DESCRIPTION OF PREFERRED AND EXEMPLARY EMBODIMENTS

Figure 4A:
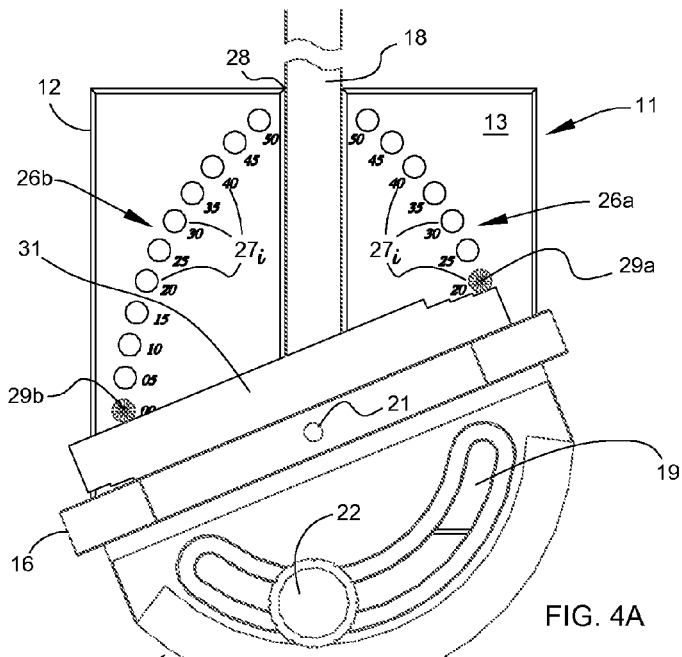
FIG. 4a is a perspective rendering of a typical miter gauge received in the precision setting fixture with the miter bar received and sliding in the miter bar channel of the fixture and the miter fence head abutting against the free straight longitudinal side edge of the accessory step bar that in turn, abuts the pair of position posts respectively seated in a base position receptacle and an angular position receptacle of the paired arcs of position receptacles for adding five angular increments to the angle defined by the position posts relative to the miter gauge bar in the miter bar channel of the fixture.

Looking at the figures, the invented precision, miter gauge setting fixture 11 includes a plate member 12 presenting a flat, horizontal surface 13 large enough to stably support a typical miter gauge 14 with a miter fence head 16 pivotally coupled near an end, to the top 17 of a depending miter bar 18 that extends horizontally out beneath the fence head 16. The fence head 16, as is typical, includes a circular slot 19 concentric with the pivot couple 21 between fence head 16 and the miter bar 18. A compass scale (not shown) indexes the circular slot 19. A knob-screw, position locking mechanism 22 secures or sets the orientation or angle of the miter fence head 16 relative to the miter bar, conventionally indicated by a pointer 23 secured to miter bar 18, here at its back end 24, and the compass scale indexing the circular slot 19.

As shown in FIG. 1, the plate member 12 of the fixture 11 has a pair of symmetrically converging, circular arcs 26a & 26b of angular position receptacles 27 drilled perpendicularly into the horizontal surface 13 of the fixture 11, and a miter bar channel 28 perpendicularly cut into the flat, horizontal surface 13 bisecting the pair of symmetrically converging, circular arcs 26a & 26b of angular position receptacles 27. The miter bar channel 28 is dimensioned for receiving the miter bar 18 of the miter gauge 14, such that the base or bottom of miter gauge fence head 16 can pivot freely, preferably in grazing contact with the plate surface 13 of the member 12.

Each angular position receptacles in the paired circular arcs 26a & 26b centers on the base angular position receptacle 27b and 27a respectively of the other paired arc. Accordingly, the radial distance (R) from each base position receptacle 27a & 27b to each angular position receptacle 27 in the other arc 26b or 26a is exactly the same, or equal. Further, as illustrated the angular position receptacle in each arc 26a & 26b are equally angularly spaced in 5° increments relative to the respective base position receptacles 27a & 27b, and range from 0° to 50°. A pair of position posts 29a & 29b, one snugly seated in the base position receptacle 27b of arc 26b of angular position receptacles, the other snugly seated in a particular angular position receptacle $27_i$ of the other arc 26a.

Skilled woodworkers and machinists should note and appreciate that the paired arcs 26a & 26b as illustrated in FIGS. 1, 2 4a and 4b, are actually paired arrays of angular position receptacles bisected by the miter bar channel 28 receiving the miter bar 18 of the miter gauge 14. The paired arrays 26 of angular position receptacles 29 need not be symmetrical, nor converging, nor circular, rather the actual constraint restricting the paired arrays 26 is that each angular position receptacle $27_p$ drilled into the horizontal surface 13 one side of the miter bar channel 28, must radially center on the base position receptacle $27_b$ of its paired array 26 on the opposite side of the bisecting miter bar channel 28. Notwithstanding, there are advantages attendant paired, symmetrically converging, circular arrays of angular position receptacles 27.

In particular, the plate member 12 with the miter bar channel 28 and drilled, symmetrically converging circular arcs of angular position receptacles 27 are easily configured using an Auto-Cad software program by setting the X and Y co-ordinates for a chosen radial distance (R) between the base receptacles 27a & 27b and the angular position receptacles $27_i$ to be compatible with an X-Y movement of a vertical milling machine. With such coordinates set, a program is easily generated for machining the plates 12 with a miter bar channel 28 bisecting symmetrically converging, circular arcs of angular position receptacles 27 using a CNC Milling machine.

In addition, looking at FIG. 3, an accessory, straight edged, step bar 31 is depicted with five incremental detent steps 32 cut into opposite, parallel straight edges 33 & 34 of, and at opposite ends 36 & 37 of the step bar 31 for incrementally adding to and subtracting from the particular angle $\theta_i$ relative to the miter bar channel 28 of the setting fixture 11 defined by the position posts 29a and 29b seated in a base position receptacle 27a or 27b and in an angular position receptacle 27 of the respective arcs 26a & 26b. As illustrated the step bar $31^j$ has length (L) greater than or equal to the radial distance (R) between the base receptacles 27a & 27b and the angular position receptacles $27_i$ plus the liner distance (S) of the detent steps 32 cut into straight edge 33 at end 37 of the step bar 31, i.e. L≧(R+3S). The step bar 31 is preferably fabricated from ⅛ inch thick aluminum plate stock, however, can be composed of any rigid, durable plate stock material thick enough to engage the miter fence heads 16 of miter gauges 14 with miter bars 18 received and sliding in the miter bar channel 28 of the setting fixture.

The depth (D) of a particular detent step $32_i$ cut into a side edge 33 or 34 of the step bar 31 for paired, symmetrically converging, circular arcs 26 of angular position receptacles 27 is calculated by the trigonometric sine relationship:

$$D = R \cdot \mathrm{Sin}(\alpha),$$

where α is the angular increment that is desired to be added to and subtracted from the angle $\theta_i$.

In more detail, the five detent steps 32 cut respectively into the opposite, straight, side edges 33 & 34 of the step bar 31 are stepped in half degree (0.5°) increments such that the deepest step $32_5$ cut into straight edge 33 at end 37 of the step bar 31 is 2.5°, and the shallowest step $32_1$ cut into straight edge 34 at end 38 of the step bar 31 is 0.5°. The depth ($D_1$) of the incremental step $32_1$ for one half degree is:

$$D_1 = R \cdot \mathrm{Sin}(0.5), \text{ and}$$

$$D_1 = R \cdot (0.0087265),$$

where R is radial distance between the respective seated base position posts 29a & 29b. The depth of the remaining detent steps can be similarly calculated for each increasing angular increment, or approximated by simply using integer multiples of $D_1$, i.e., for each of the four remaining detent steps 32:

$$D_2 = (2 \cdot D_1) \text{ for } 1°,$$

$$D_3 = (3 \cdot D_1) \text{ for } 1.5°,$$

$$D_4 = (4 \cdot D_1) \text{ for } 2°, \text{ and}$$

$$D_5 = (5 \cdot D_1) \text{ for } 2.5°.$$

Given that respective arcs 26a & 26b of angular position receptacles 27 of the described precision setting fixture 11 are equally angularly spaced five degrees (5°) apart, the described accessory detent step bar 31 (FIG. 3) with it five detent steps 32 incrementally increasing in depth corresponding to half degree increments to be added to or subtracted from in any particular setting angle $\theta_i$ defined by the respectively seated position posts 29a and 29b, allows an individual to precisely set the angle of a miter gauge fence head 16 relative to its miter bar 18 in half degree increments ranging form 0° to 52.5° with the fixture 11.

Figure 4B:
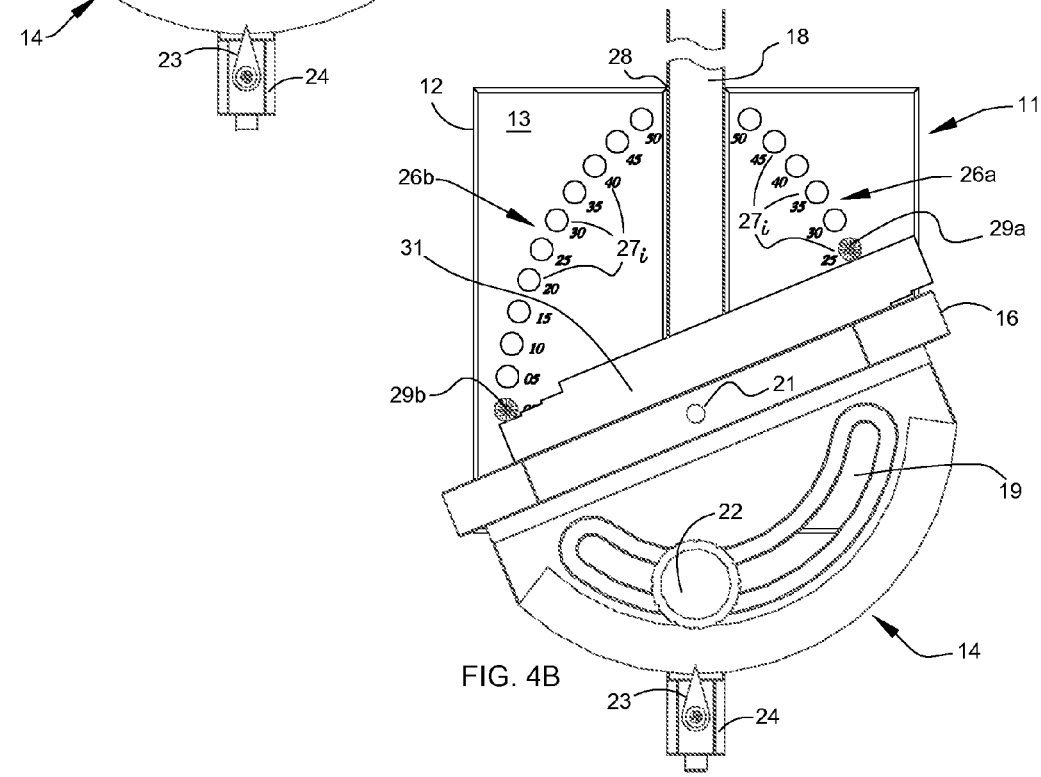
FIG. 4b is the same perspective rendering as FIG. 4a, with the accessory step bar abutting against the respectively seated pair of posts now positioned for subtracting five angular increments from the angle defined by the position posts relative to the miter gauge bar in the miter bar channel of the fixture.

In particular, looking at FIGS. 4a & 4b, to add to a particular setting angle $\theta_i$ defined by the respectively seated position posts 29a and 29b, the particular detent step $32_i$ of step bar 31 abuts against the position post 29a seated in angular position receptacle $27_i$ of arc 26a of angular position receptacles 27. To subtract from the particular setting angle $\theta_i$ defined by the respectively seated position posts 29a and 29b, the step bar 31 is simply flipped over, allowing the particular detent step $32_i$ to abut against the position post 29b seated in base position receptacle 27b of the arc 26b of angular position receptacles 27.

An individual sets the angle of a miter gauge fence head 16 relative to the miter bar 18 of a miter gauge 14 by placing the miter gauge 14 on the setting fixture 11 with the miter bar 18 received in the miter bar channel 28 of plate member 12, and sliding the miter bar 18 in the channel, allowing the fence head 16 to pivot either into contact with the pair of position posts 29a and 29b, respectively seated in a base position receptacle 27b and an angular position receptacle $27a_i$ of the other paired arc 26a, or into contact with the free or open, longitudinal, straight edge of the detent step bar 31, not abutting against the so seated position posts 29a & 29b, and then setting and securing the fence head 16 at the particular angle $\theta_i$ (relative to the miter bar channel of the fixture and received miter bar) determined by the seated pair of position posts 29a & 29b, or that particular angle $\theta_i$, plus or minus an angular increment a determined by the depth $D_i$ of the detent of the step bar 31 abutting against one or the other of the position posts 29a or 29b, i.e. $\theta_i \pm \alpha$.

Those skilled in the art should also realize and appreciate, not all miter angles to which a miter gauge must be set to produce two precisely mitered corner pieces can be achieved using half degree angular increments added to and subtracted from a particular angle $\theta_i$ determined by the respectively seated position posts 29a & 29b, where the arrays of angular position receptacles are uniformly angularly spaced a whole number of angular units apart. For example, a seven-sided picture frame (a regular heptagon) requires a miter cut of 25.714°. Here a custom step bar 31 can be created having a detent step with a depth D corresponding to 0.714°, i.e. D=R·Sin (0.714°), where R is the radial distance between the respectively seated position posts 29a & 29b.

Custom step bars can also be created for compound miters that typically involve setting unique bevel or tilt angles of the cutting (saw) blade and unique miter gauge angles. For example, when crown moldings must be cut for junctions at room corners, custom step bars 31 can be created having detent steps with depths that will set both angles, one detent step for the blade bevel or tilt and one for the miter gauge, pre-calculated for a desired or particular compound miter joint. To explain, the most common spring or slope angles for crown molding are 45/45 and 52/38, meaning 52° from the ceiling and 38° from the wall. The bevel or tilt angle of the (saw) blade β may be calculated using the trigonometric relationship:

$$\beta = \text{ArcSin}(\text{Sin}(\pi/2 - \|\lambda\|) \cdot \text{Sin}(\omega/2)), \text{ and}$$

the miter angle θ may be calculated using the trigonometric relationship:

$$\theta = \text{ArcTan}(\text{Cos}(\pi/2 - \lambda) \cdot \text{Tan}(\omega/2)),$$

where λ is the slope/spring angle of the crown molding, and ω is the angle of the wall corner.

Accordingly, for a 45/45/crown molding and a 90° wall corner, the bevel or tilt angle of the (saw) blade, β=30°, and the miter angle θ=35.264°. For a 52/38 crown molding and a 90° wall corner, the bevel or tilt angle of the (saw) blade, β=33.863°, and the miter angle, θ=31.614°.

The bevel or tilt angle of a (saw) blade tilt can be precisely set using a miter gauge and the invented precision setting fixture as follows:

1. Cut one end of a straight piece of good, true wood or MDF about 2 inches wide and 12 inches long across its width with the miter fence set at the calculated (saw) blade bevel or tilt angle using the precision setting fixture;
2. Reset the miter gauge to 00 using the precision setting fixture;
3. Disconnecting power to the machine, square the piece set on its side edge with miter gauge to the fully raised (saw) blade of the machine, adjust its tilt until the angle of the blade, front and back, matches that of the mitered cut end of the piece.

Once the bevel or tilt angle of the (saw) blade is set, the miter gauge is reset to the calculated miter angle using the precision setting fixture, that particular compound miter, so set, can then be repeatedly cut all day long.

From the above, the skilled practitioner should note and appreciate that the described precision miter gauge setting fixture may include sets of custom accessory detent step bars 31, each with detent steps 32 for addressing particular miter angle setting situations commonly encountered in the field.

The skilled practitioner should also note and appreciate that if the respective paired arrays 26 of angular position receptacles 27 do not share a common radial distance from the base position receptacles 27a & 27b (do not symmetrically converging as circular arc arrays) then the relationship between the depth $D_i$ of a particular detent step $32_i$ cut into one of the longitudinal straight side edges 33 or 34 of the step bar 31 proximate one or other of its ends 37 or 38 and the angular increment a that is desired to be added to and subtracted from the angle $\theta_i$ defined by the respectively seated position posts 29a & 29b will be expressed using a trigonometric tangent relationship:

$$D = R \cdot \text{Tan}(\alpha),$$

where R is the distance between the particular position posts 29a or 29b respectively seated in the base position receptacle 26a or 26b of an array on one side of the bisecting miter bar channel 28 and a particular angular position receptacle $27_i$ in the paired array on other side of the miter bar channel 28.

Also those skilled in the art should also note and appreciate, that while the precision, miter gauge setting fixture is described in context of plate member 12 presenting a flat horizontal surface 13, almost every primary machine used to shape, cut and form wood, metal, plastic, fiber and other common stock materials, e.g., table saws, band saws, sanding machines, grinders, shapers, routers, and the like, also present a comparable horizontal or table surface, most with an associated miter bar channel already cut into the work table surface on either side of, and oriented parallel to the cutting/working element of the particular machine. Paired arrays of precise angular position receptacles can be drilled into such work table surfaces relative to the miter bar channels in those surfaces, for precisely setting a miter gauge associated with the particular machine that will perform substantially the same function, in substantially the same way to achieve substantially the same result as the symmetrically converging arcs 26a & 26b of angular position receptacles 27 specified above. Similarly, the respective elements described for effecting the desired functionality can be configured differently, per constraints imposed by different mechanical systems, yet perform substantially the same function, in substantially the same way to achieve substantially the same result as the above components described and specified by the Applicant. For example, a worktable surface of a machine could offer a socket aperture adapted to accept plate member plugs with a miter bar channel 28 aligned with that of the worktable wherein each plate member plug presents paired arrays of different, angularly spaced, position receptacles.

Accordingly, while mechanical components suitable for implementing the invented precision, miter gauge setting fixture may not be exactly described herein, they may fall within the spirit and the scope of invention as described and set forth in the appended claims.

I claim:

1. A precision setting fixture for setting a fence head of a miter gauge at a particular angle relative to a miter bar pivotally coupled to the fence head, comprising, in combination:
   (i) a member presenting a flat surface with a miter bar channel dimensioned for snugly receiving the miter bar of the miter gauge, bisecting a pair of symmetrical arrays of spaced, angular position receptacles drilled into the flat plate surface, where each angular position receptacle radially centers on a base position receptacle of the other array of position receptacles; and
   (ii) a pair of position posts, one snugly seated in the base position receptacle of one of the arrays of angular position receptacles, the other snugly seated in a particular angular, position receptacle of the other array;
whereby, the angle of the fence head of the miter gauge is set by placing the miter gauge on the fixture with the miter bar received in the miter bar channel, sliding the gauge in the miter bar channel allowing the miter gauge fence head to pivot into contact with both position posts, and setting the fence head of the gauge at a particular angle $\theta$ relative to the miter bar received within the miter bar channel defined by the respectively seated position posts.

2. The precision setting fixture of claim 1 wherein the pair of symmetrical arrays of spaced, angular position receptacles drilled into the flat surface of the fixture are circular arcs and converge such that the angular position receptacles of each arc are at the same radial distance (R) from the base position receptacle of the other arc of angular position receptacles.

3. The precision setting fixture of claim 1 or 2 and further including a straight edged, step bar having parallel longitudinal side edges, and a length spanning a radial distance (R) between the base post receptacle of one of the array of angular position receptacles and a particular, angular position receptacle of the other array of angular position receptacles, and having at least one detent step cut into at least one longitudinal side edge of the step bar proximate at least one end of the bar abutting against one of the two respectively seated position posts for incrementally decreasing and increasing the angle the longitudinal, straight side edge of the bar opposite the step detent makes relative to the angle $\theta$ defined by the pair of respectively seated position posts, whereby, the angle of the fence head of the miter gauge is set by placing the miter gauge on the fixture with the miter bar received in the miter bar channel, and sliding the gauge in the channel allowing the miter gauge fence head to pivot into contact with the longitudinal straight edge of the step bar opposite the step detent, and setting the fence head of the gauge at a particular angle relative to the miter bar defined by the longitudinal straight edge of the step bar opposite the step detent.

4. The precision setting fixture of claim 3 wherein the detent step cut has a depth D determined by a trigonometric tangential relationship $D=R \cdot Tan(\alpha)$, where R is the radial distance between the base post receptacle of one of the arcs of position receptacles and a particular angularly spaced, position receptacle of the other arc of position receptacles, and $\alpha$ is a desired angular units that is added to and subtracted from the angle $\theta$ defined by the respectively seated position posts.

5. The precision setting fixture of claim 2 further including a straight edged, step bar having parallel longitudinal side edges and length spanning the radial distance (R) between the base position receptacle of one of the arcs of position receptacles and the respective, angularly spaced, position receptacles of the other arc of position receptacles, and having at least one detent step detent cut a depth D into at least one longitudinal side edge of the step bar proximate at least one end of the step bar abutting against one of the two respectively seated position posts for decreasing and increasing the angle the longitudinal straight side edge of the bar opposite the step detent makes relative to the angle $\theta$ defined by the respectively seated position posts relative to the miter bar channel of the fixture, where the depth D of the step is determined by a trigonometric sine relationship $D=R \cdot Sin(\alpha)$, where $\alpha$ is a desired angular increment that is added to and subtracted from the angle $\theta$, whereby, the angle of the fence head of the miter gauge is set by placing the miter gauge on the fixture with the miter bar received in the miter bar channel, and sliding the gauge in the channel allowing the miter gauge fence head to pivot into contact with the longitudinal straight edge of the step bar opposite the step detent, and setting the fence head of the gauge at a particular angle ($\theta \pm \alpha$) relative to the miter bar defined by the longitudinal straight edge of the step bar opposite the step detent.

6. The precision setting fixture of claim 5 wherein:
   i. the angular position receptacles of each circular arc are spaced an equal angular intervals apart; and
   ii. the straight edged step bar has a series of detent steps $S_i$ cut, in increasing increments of depth $d_i$ into the parallel longitudinal side edges proximate opposite ends of the step bar, and on opposite longitudinal sides of the step bar, where the depth $d_i=R \cdot Sin(\alpha_i)$, where $\alpha_i$ is a desired increment angular increment that is added to or subtracted from the angle $\theta$ in increments, by positioning the step bar with a particular detent step $S_i$ abutting against one or the other of the respectively seated position posts.

7. The precision setting fixture of claim 5 wherein:
   i. the angular position receptacles of each circular arc are spaced an equal angular distance apart; and
   ii. the straight edged step bar has a series of detent steps $S_i$ cut, in increasing equal increments of depth d into the parallel longitudinal side edges, proximate opposite ends, and on opposite longitudinal sides of the step bar, where the depth $d=R \cdot Sin(\omega)$, where $\omega$ is an approximate desired angular increment that is added to or subtracted from the angle $\theta$ in increments by positioning the step bar with a particular detent step $S_i$ abutting against one or the other of the respectively seated position posts.

8. The precision setting fixture of claim 6 or 7 wherein angular position receptacles drilled into the flat plate surface of the fixture are spaced 5° apart and the desired angular increment that is added to and subtracted from, the angle $\theta$ in increments, is 0.5°.

9. The precision setting fixture of claim 6 or 7 wherein angular position receptacles drilled into the flat plate surface of the fixture are spaced 5° apart and the desired angular increment that is added to and subtracted from, the angle $\theta$ in increments, is 30 minutes of arc.

10. The precision setting fixture of claim 2 wherein the angular position receptacles of each circular arc are spaced equal angular intervals apart.

* * * * *